United States Patent
Oguara et al.

(10) Patent No.: US 11,983,097 B2
(45) Date of Patent: May 14, 2024

(54) RANKING TESTS BASED ON CODE CHANGE AND COVERAGE

(71) Applicant: EMC IP Holding Company LLC, Hopkinton, MA (US)

(72) Inventors: Tonworio Oguara, Everett, WA (US); Xu Jian, Shanghai (CN); Chen Sun, Seattle, WA (US); YuChan Lo, Taoyuan Dist. (TW)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/385,692

(22) Filed: Jul. 26, 2021

(65) Prior Publication Data
US 2023/0025441 A1 Jan. 26, 2023

(51) Int. Cl.
G06F 11/36 (2006.01)

(52) U.S. Cl.
CPC ........ *G06F 11/368* (2013.01); *G06F 11/3676* (2013.01); *G06F 11/3684* (2013.01); *G06F 11/3688* (2013.01); *G06F 11/3692* (2013.01)

(58) Field of Classification Search
CPC .............. G06F 11/368; G06F 11/3676; G06F 11/3684; G06F 11/3688; G06F 11/3692
See application file for complete search history.

(56) References Cited

U.S. PATENT DOCUMENTS

| 9,311,223 | B2 * | 4/2016 | Bartley | G06F 11/3676 |
| 2009/0222697 | A1 * | 9/2009 | Thakkar | G06F 11/3676 714/38.1 |
| 2013/0061209 | A1 | 3/2013 | Lam | |
| 2013/0159774 | A1 * | 6/2013 | Budnik | G06F 11/3688 714/33 |
| 2014/0331206 | A1 | 11/2014 | Abraham et al. | |
| 2017/0060734 | A1 * | 3/2017 | Raz | G06F 11/3692 |
| 2019/0377666 | A1 * | 12/2019 | Klein | G06F 11/3692 |
| 2020/0394121 | A1 * | 12/2020 | Hicks | G06F 11/3676 |

(Continued)

OTHER PUBLICATIONS

Pathy, Sarita, Santosh Panda, and S. A. R. A. D. A. Baboo. "A review on code coverage analysis." International Journal of Computer Science & Engineering Technology (IJCSET) 6.10 (2015): 580-587. (Year: 2015).*

(Continued)

*Primary Examiner* — Kevin L Young
*Assistant Examiner* — Joanne G Macasiano
(74) *Attorney, Agent, or Firm* — Amin, Turocy & Watson, LLP

(57) ABSTRACT

A system can identify a file comprising computer-executable instructions, wherein the file has been modified since the file was last transformed into a computer-executable program on which a group of tests was performed. The system can, for respective tests, determine respective line coverage ratios, respective function coverage ratios, and respective branch coverage ratios. The system can select an updated group of tests from the group of tests based on the respective line ratios, the respective function ratios, and the respective branch ratios, the updated group of tests comprising a subgroup of the group of tests. The system can create an updated computer-executable program from the file. The system can test the updated computer-executable program with the updated group of tests.

20 Claims, 12 Drawing Sheets

(56) References Cited

U.S. PATENT DOCUMENTS

2021/0357314 A1   11/2021   Wu
2022/0004693 A1   1/2022    Yu
2022/0114076 A1   4/2022    Zhou et al.
2022/0253377 A1   8/2022    Coutinho Moraes et al.

OTHER PUBLICATIONS

Pöyry, Pekka. "Coverage based safe regression test selection method for Python programs." (2017). (Year: 2017).*

Mulkahainen, Markus. Test case selection and prioritization in continuous integration environment. MS thesis. 2019. (Year: 2019).*

Spieker, Helge, et al. "Reinforcement learning for automatic test case prioritization and selection in continuous integration." Proceedings of the 26th ACM SIGSOFT International Symposium on Software Testing and Analysis. 2017. (Year: 2017).*

Miranda, Breno, and Antonia Bertolino. "Improving test coverage measurement for reused software." 2015 41st Euromicro Conference on Software Engineering and Advanced Applications. IEEE, 2015. (Year: 2015).*

Oguara, et al. "Ranking Tests Based on Code Change and Coverage"—U.S. Appl. No. 17/385,671, filed Jul. 26, 2021, 62 pages.

Notice of Allowance issued by the U.S. Patent Office for U.S. Appl. No. 17/385,671 dated Sep. 8, 2022, 37 pgs.

* cited by examiner

300

302
Legend:
Low <75%
Medium >= 75%
High >= 90%

306

|  | Hit | Total | Coverage |
|---|---|---|---|
| Lines: | 80 | 100 | 80% |
| FNs: | 15 | 60 | 25% |
| Branches: | 70 | 90 | 77% |

304

| File Name | Line Coverage | Functions | Branches |
|---|---|---|---|
| <File 1> | 90% | 30% | 80% |
| <File 2> | 70% | 10% | 75% |
| <File 3> | 75% | 20% | 70% |

RANKING TESTS BASED ON CODE CHANGE AND COVERAGE COMPONENT
308

$t_{1_c} = t_{1_{fx_c}}$ and $f_{1_c} = t_{x_{f_{1_c}}}$ and $t_{x_{f_{1_c}}} = \{t_{1_{f_{1_{c^l}}}}, t_{1_{f_{1_{c^f}}}}, t_{1_{f_{1_{c^b}}}}\}$ then: $t_{1_c} = \{(t_{1_{f_{1_c}}}, t_{1_{f_{2_c}}}, \ldots, t_{1_{f_{x_c}}})\}$ and: $f_{1_c} = \{(t_{1_{f_{1_c}}}, t_{2_{f_{1_c}}}, \ldots, t_{m_{f_{1_c}}})\}$ thus: $f_{1_c} = \{\left(t_{1_{f_{1_{c^l}}}}, t_{1_{f_{1_{c^f}}}}, t_{1_{f_{1_{c^b}}}}\right), \left(t_{2_{f_{1_{c^l}}}}, t_{2_{f_{1_{c^f}}}}, t_{2_{f_{1_{c^b}}}}\right), (\ldots), \left(t_{m_{f_{1_{c^l}}}}, t_{m_{f_{1_{c^f}}}}, t_{m_{f_{1_{c^b}}}}\right)\}$ now if: $t_{1_{f_{1_{c^l}}}} = \{\frac{total\_lines\_hit}{total\_instrumented\_lines}\}$ for $f_1$ based on test $t_1$, then:

the *CoverageRank* of $t_1$ based on $f_1$ will be $CR_{t_{1_{f_1}}} = \{\left(t_{1_{f_{1_{c^l}}}} + t_{1_{f_{1_{c^f}}}} + t_{1_{f_{1_{c^b}}}}\right)\}$

FIG. 7

RANKING TESTS BASED ON CODE CHANGE AND COVERAGE

BACKGROUND

A computer program can be written in a programming language, and stored among multiple of files that are then compiled into the executable program. A program can be tested with multiple tests to verify whether the program functions as intended.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

The system can identify a file comprising computer-executable instructions, wherein the file has been modified since the file was last transformed into a computer-executable program on which a group of tests was performed. The system can, for respective changed lines of the file and for respective tests of the group of tests that test the respective changed lines, determine respective line coverage ratios that represent respective ratios between the respective ones of the respective changed lines that are tested by the respective tests and respective total changed lines in the file. The system can, for respective changed functions of the file and for respective tests of the group of tests that test the respective changed functions, determining respective function coverage ratios that represent respective ratios between the respective ones of the respective changed functions that are tested by the respective tests and respective total changed functions in the file. The system can, for respective changed branches of the file and for respective tests of the group of tests that test the respective changed branches, determine respective branch coverage ratios that represent respective ratios between the respective ones of the respective changed branches that are tested by the respective tests and respective total changed branches in the file. The system can select an updated group of tests from the group of tests based on the respective line ratios, the respective function ratios, and the respective branch ratios, the updated group of tests comprising a subgroup of the group of tests. The system can create an updated computer-executable program from the file. The system can test the updated computer-executable program with the updated group of tests.

An example method can comprise, for respective changed lines of a file that corresponds to a computer program, and for respective tests of the group of tests that test the respective changed lines, determining, by a system comprising a processor, respective line coverage ratios that represent respective ratios between the respective ones of the respective changed lines that are tested by the respective tests and respective total changed lines in the file. The method can further comprise, for respective changed functions of the file and for respective tests of the group of tests that test the respective changed functions, determining, by the system, respective function coverage ratios that represent respective ratios between the respective ones of the respective changed functions that are tested by the respective tests and respective total changed functions in the file. The method can further comprise, for respective changed branches of the file and for respective tests of the group of tests that test the respective changed branches, determining, by the system, respective branch coverage ratios that represent respective ratios between the respective ones of the respective changed branches that are tested by the respective tests and respective total changed branches in the file. The method can further comprise selecting, by the system, at least one test from the group of tests based on the respective line ratios, the respective function ratios, and the respective branch ratios. The method can further comprise testing, by the system, the updated computer program with the at least one test.

An example non-transitory computer-readable medium can comprise instructions that, in response to execution, cause a system comprising a processor to perform operations. These operations can comprise determining that a file that is part of a computer program has been modified since the computer program was tested with a group of tests. These operations can further comprise determining line coverage of a first test of the group of tests, wherein the line coverage represents a value of a first number of changed lines of a group of changed lines of the file tested by the first test relative to a second number of total changed lines of the file. These operations can further comprise testing the computer program with the first test based on the first test having a higher line coverage than a second test of the group of tests.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates an example report of code coverage that can facilitate ranking tests based on code change and coverage, in accordance with an embodiment of this disclosure;

FIG. 7 illustrates an example of determining a test ranking that can facilitate ranking tests based on code change and coverage, in accordance with an embodiment of this disclosure;

DETAILED DESCRIPTION

Overview

Figure 1:
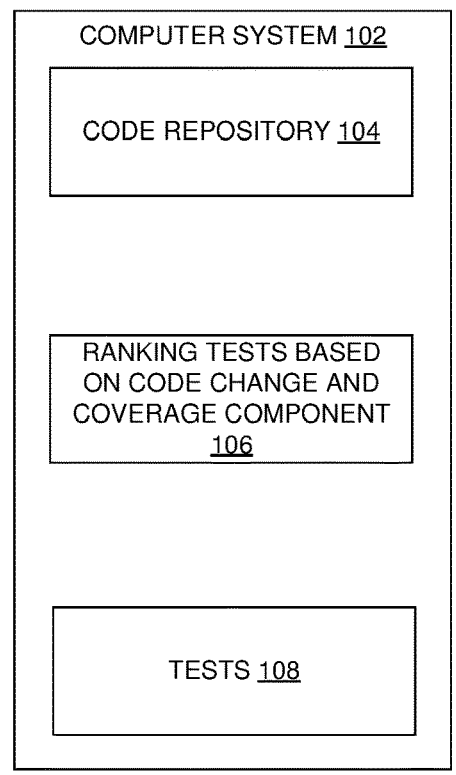
FIG. 1 illustrates an example system architecture that can facilitate ranking tests based on code change and coverage, in accordance with an embodiment of this disclosure.

A problem in the development of a software with a large, evolving code base can be the execution of a large number of regression tests to ensure that new features, code refactoring, and bug fixes have not introduced any new defects, broken existing and working features, and the software has not regressed. In some examples, the code churn can be extremely high and it may not be easy to easily identify possible areas for regression testing during development.

A common testing strategy to address this challenge can be to re-run all (sometimes referred to as "re-test all") regression tests in the test suite. There can be problems with this approach. One problem can be an amount of resources required to run these test can be large and expensive. Another problem can be, for large and complex systems, these regression tests can take several hours to complete and in some cases even days or weeks.

Approaches according to the present techniques can provide for better testing of updated computer programs. Tests in a test suite can be ranked, and a subset of tests that are ranked highest (based on the changed code) can be run, saving time and resources while still testing a large portion (or all) of the updated code. An example approach for ranking tests can be referred to as CoverageRank (CR)

During a coverage test pass, coverage information of each file executed by a given test in the software can be monitored and then aggregated as the coverage information of the file based on the test. This coverage information can then be further analyzed into a CoverageRank that factors into the selection and prioritization of a set of tests to be executed against a changeset during a product development cycle. CoverageRank can leverage code coverage information of a file based on the test.

Measurements can be made as to whether a complete set of tests to validate a software release are known. For software with a large and complex codebase involving multiple programming languages, quality management can be a significant challenge for validation engineers. One approach used to calibrate whether software is ready to be released is regression testing. Regression testing can generally comprise testing the whole system to assert that new development work involving new features and bug fixes have not broken the current system. Executing regression tests all through a software development cycle can be beneficial because it can have a tendency to detect defects early in a development process, when the cost of fixing these defect is still low.

However, as a software source code grows over time, running regression tests over a large, constantly evolving, complex software with large daily code churn can be challenging. A challenge can include regression tests can take too long to complete, thus slowing down engineering velocity. Another challenge can be that running a large amount of regression tests can be resource and time intensive, and thus too expensive and costly over time. Another challenge can be that a value of regression testing can become diminished as these tests are executed over and over again against the same features and codebase.

Another challenge can be that new engineers can find it hard to know which set of regression tests to execute when they make bug fixes or extend an existing functionality to accommodate new features. Another challenge can be that overtime engineers may become dispirited and misjudge issues detected by regression tests. Another challenge can be that, as the software codebase grows, the regression tests can become large and complex as well, leading to a higher test complexity and maintenance. Another challenge can be that some of the tests can become brittle overtime and lose their value.

In some examples, the present techniques can provide for the following. A CoverageRank approach can comprise a code coverage ranking technique associated with a file, which is based on the coverage information of the file. The technique can be used to minimize the set of tests executed during a regression run, thus reducing the cost of running several expensive regression tests.

A component mapping schema can be implemented that provides a schema for a mapping of component↔[targets, tests]. Using this schema, components of a large and complex codebase can be mapped to their targets, and to actual tests associated with the targets and components. Mapping source files and directories (e.g., targets) to their components can facilitate identifying hot spots within a codebase; identifying what code and targets should be tested more based on quality, high risk metrics, and change impact analysis; and providing test completeness reports during development.

The present techniques can provide for an efficient test selection strategy. Regression testing can be expensive, resource intensive, long running, and over time can become brittle and ineffective. The present test recommendation strategy based on the present ranking techniques can mitigate against these issues.

Regression challenges in testing a codebase can be mitigated against by leveraging code coverage information derived from software test effectiveness and efficiency. CoverageRank techniques can generally be related to an analysis of code coverage data associated with files being tested, and thus provide an efficient approach to identifying, selecting, prioritizing, and recommending tests appropriate to be executed against a modified file.

The coverage information associated with a file being tested can be collected as follows. Instrumentation of source code. Installation of instrumented binaries. Execution of tests against the instrumented binaries. Aggregation of generation of code coverage reports.

The present techniques can thus provide an automated software analysis approach that analyzes aggregated code coverage information, and recommends a most suitable set of one or more tests to be executed against a modified set of files based on the ranking associated with the files and the test(s).

In a CoverageRank technique, code coverage information associated with each file in the system based on the tests executed against the file can be collected. The coverage rank can be calculated based on the line, function and branch coverage of the file associated with the test. Since the coverage testing of a file can be done by different tests, a single file can be associated with multiple CoverageRanks, as well. In such scenarios, a test with a highest coverage rank can be prioritized and recommenced as a most suitable test to be executed against the file.

A CoverageRank technique can be composed of two phases. In a first phase, which can be part of a data collection phase, a test advisor (TA) database is updated with details of regression tests executed, a list of the files tested and a corresponding identifier of which test actually executed those files as well as the coverage (line, function, and branch) details of the files based on the test that executed the file. In a second phase, a test selection and recommendation engine can be invoked to compute coverage ranks of the files (in the changeset) based on the tests, and a prioritized recommended set of tests to be executed against the files within the changeset can be provided. The following is an example overview of an approach according to the present techniques:

1. Determine and update the TA database with the initial code coverage information for each file in the regression test coverage results. The TA database is updated at the end of the code coverage test pass to reflect an up-to-date coverage information for a particular build. In some examples, coverage information associated with a most recent build is used as baseline coverage data. In other examples, a different baseline coverage data can be selected.

2. For each file associated with a test, compute the coverage rank of the file based on the test and update the TA database. In some examples, coverage rank values can be determined at a time that coverage data is collected to reduce a computational overhead at a time of usage. In other examples, cover rank values can be determined at a time of usage.

3. Identify a set of changed files in the changeset or pull request submitted by the developer.

4. In the TA database, look up a set of tests executed against the files in the changeset or pull request and do the following:

For each file (F), identify a subset of tests (T') with coverage values for F.

Recommend T' as the sets of tests to be executed against F. The recommendation can be based on CoverageRank values of the tests in T' sorted in descending order.

If the set of selected test lists is above a predetermined threshold size, additional prioritization strategies can be implemented to reduce the subset of tests selected. In some examples, for a large subset of test T', historic test data, such as execution time and fault detection rate can be used as additional prioritization criteria.

5. The selected and prioritized set of tests can be executed against the build with the changeset in question.

Using the selective testing strategy based on a CoverageRank technique can avoid running too many low value, unfocused tests. This approach can also improve an overall engineering velocity. A prioritization strategy can make it possible to find a minimum set of tests with maximum test coverage and fault detection capabilities. The effectiveness of the selected set of tests can constantly be improved by an inclusiveness (e.g., how many failed or failing tests are included in the selection set) and correctness strategy (e.g., how many unnecessary tests are included).

To generate a minimum set of tests to be executed based on a changeset or pull requests (PR), the code coverage results of each file in the changeset or PR can be used. While only the code coverage information attribute is being utilized in this example, other test attributes (such as execution time or defect frequency) or combinations of code coverage information attributes and other file and test attributes can be used, as well.

Once an ordered set of test lists is generated for each coverage category (lines, functions and branches), a rank of the file based on the test can be computed and the test with a highest overall coverage rank in each category can be recommended to be executed against the file. This approach can reduce a number of tests to be executed per changeset or pull request to a reduced set. A more extensive approach can be to set a fixed threshold and recommend the first N test lists in each category that meets the threshold for execution.

In some examples, tests can be selected according to a variety of techniques. For example, tests with a highest coverage ratio (e.g., line coverage, branch coverage, and/or function coverage) can be selected. Additionally, in some examples, selected tests can be selected to cover a large amount of changed lines. For example, where Test A covers 99% of the changes, and Test B covers only 1% of the changes, but it is the 1% not covered by Test A, then both tests can be selected despite Test B having a low coverage ratio.

Take an example with a single file F in a changeset, and from the code coverage information on F, there are three tests ($t_1$, $t_2$, $t_3$) that tested F. For each test G the coverage can be computed as it relates to F, and then a CoverageRank can be determined for the test based on the file executed. An example can be:

<F, <$t_1$, 1.9>>—where 1.9 is the determined rank of test $t_1$ based on executing F <F, <$t_2$, 1.5>>—where 1.5 is the determined rank <F, <$t_3$, 0.5>>—0.5 is the determined rank These can be combined to produce:

<F, [<$t_1$, 1.9>, <$t_2$, 1.5>, <$t_3$, 0.5>]].

In some examples, test $t_1$ can be selected because test $t_1$ has a highest CoverageRank when executed against F. Similarly, given a set of files $F_x$, and a set of tests $T_x$, a rank for each $t_x \in T_x$ can be determined based on the executed file $f_x \in F_x$ and a subset of test(s) to be executed against the file(s) in the changeset can be selected based on the rank.

Example Architectures

FIG. 1 illustrates an example system architecture 100 that can facilitate ranking tests based on code change and coverage, in accordance with an embodiment of this disclosure. System architecture 100 comprises computer system 102, which can be implemented with part(s) of instances of computer 1202 of FIG. 12.

In turn, computer system 102 comprises code repository 104, ranking tests based on code change and coverage component 106, and tests 108. Code repository 104 can comprise a version control system for files that contain computer code for a computer program. Developers can store their work on a computer program in code repository, including different versions of a program.

Tests 108 can comprise one or more tests that are run on the code in code repository 104, or a corresponding program, to determine whether the program operates correctly. Examples of tests can include testing various features of the program, testing boundary input values to the program, and testing known failure conditions of the program.

Ranking tests based on code change and coverage component 106 can determine a subset of tests of tests 108 with which to test an updated version of a program maintained in code repository 104. Regression testing can generally comprise testing an update to a program to determine whether the updated program still functions as intended.

In some examples, running all tests of tests 108 that correspond to a given program maintained with code repository 104 can be burdensome in taking a long time, as well as a large amount of computing resources. It can be that an update to a program does not alter all functionality of the program, so testing of portions of the program that are not modified can be omitted to save time and computing resources.

Ranking tests based on code change and coverage component 106 can rank tests of tests 108 based on how much they test the modified portions of the program (relative to testing unmodified portions of the program). From this ranking, ranking tests based on code change and coverage component 106 can select a subset of tests 108 that correspond to the program, and test the updated program with the selected subset of tests. By testing the updated program with a subset of tests 108 rather than all of tests 108 that correspond to the program, time and computing resources can be saved on regression testing, while maintaining a high quality of testing.

Figure 2:
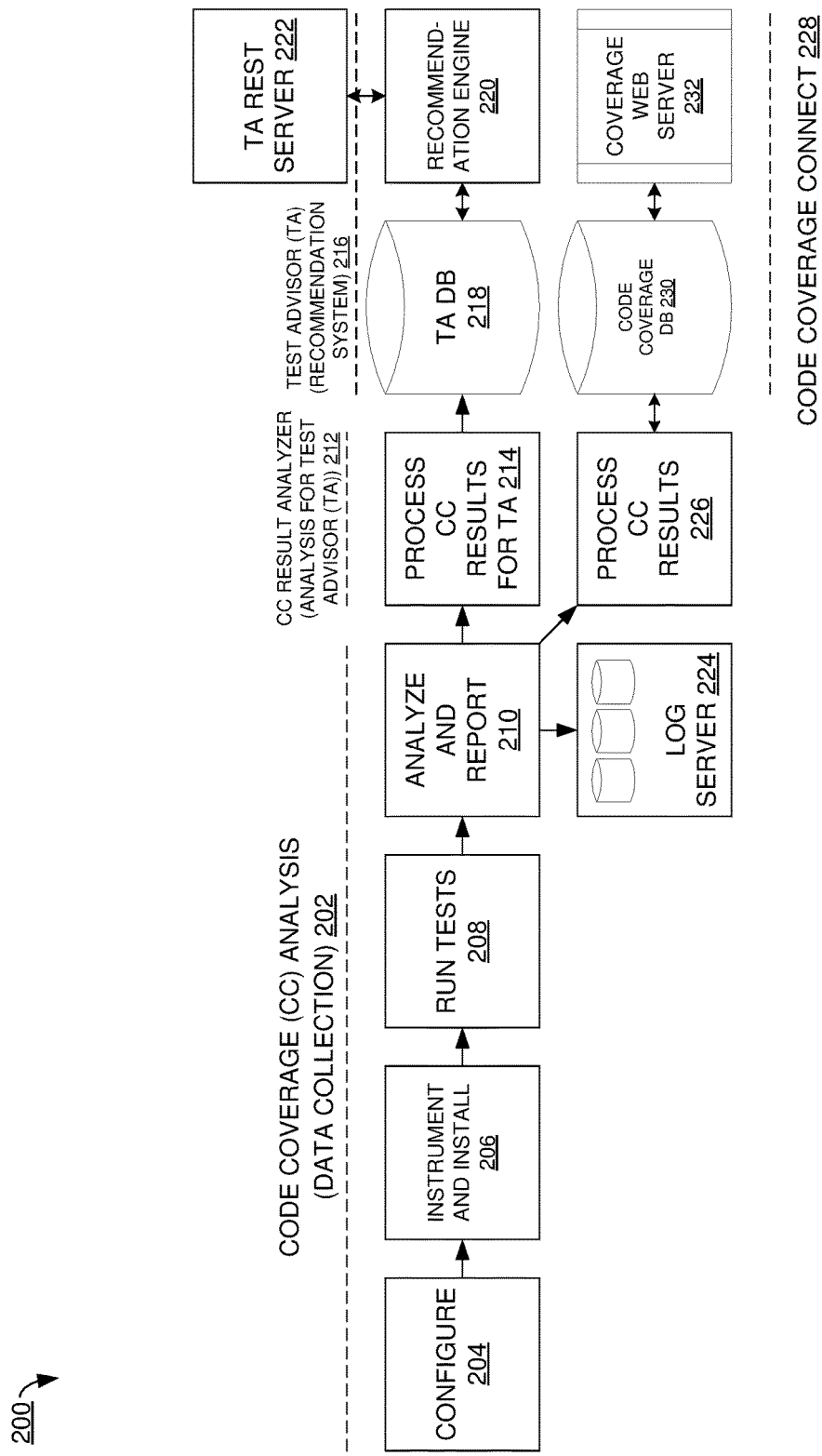
FIG. 2 illustrates another example system architecture that can facilitate ranking tests based on code change and coverage, in accordance with an embodiment of this disclosure.
Figure 4:
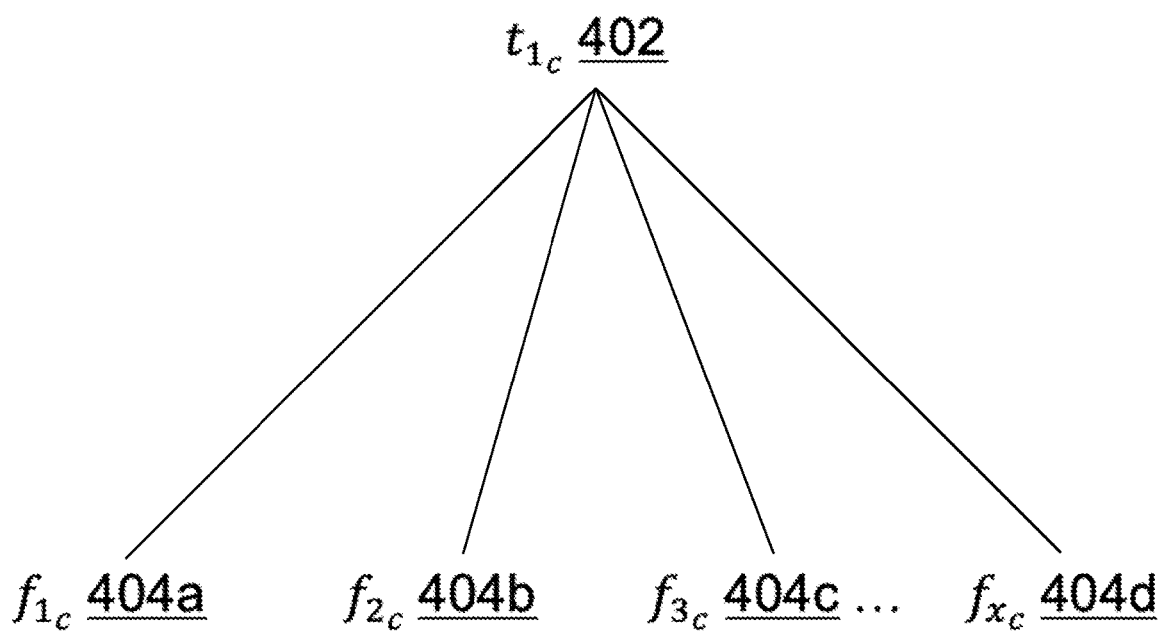
FIG. 4 illustrates an example tree structure of code coverage results that can facilitate ranking tests based on code change and coverage, in accordance with an embodiment of this disclosure.
Figure 6:
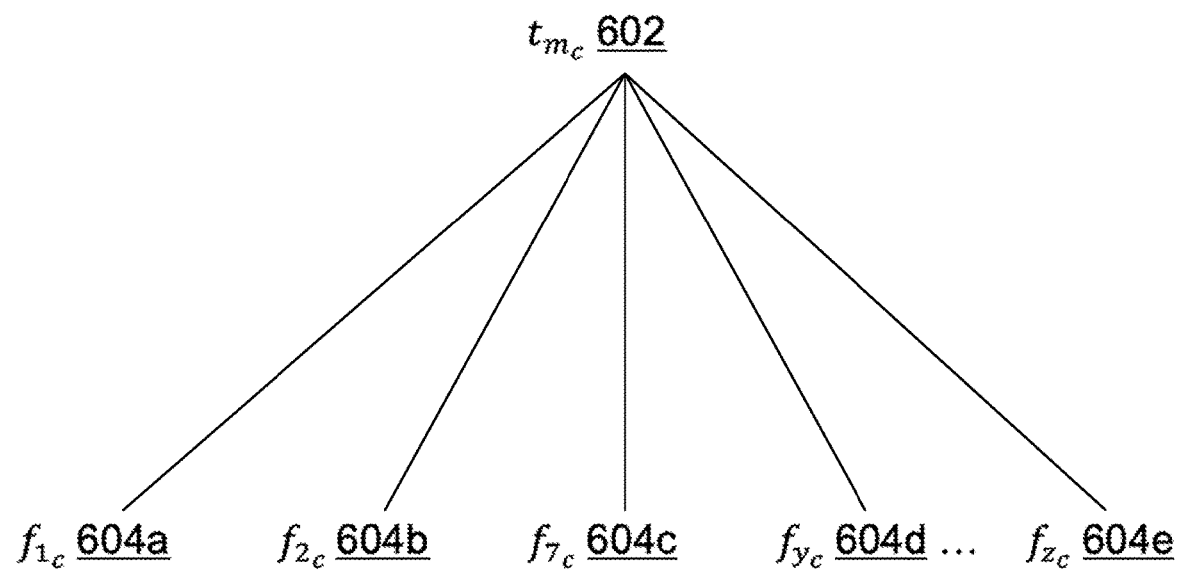
FIG. 6 illustrates another example tree structure of code coverage results that can facilitate ranking tests based on code change and coverage, in accordance with an embodiment of this disclosure.

In the course of implementing ranking tests based on code change and coverage, ranking tests based on code change and coverage component 106 can implement part(s) of system architecture 200 of FIG. 2, report 300 of FIG. 3, tree structure 400 of FIG. 4, tree structure 500 of FIG. 6, tree structure 600 of FIG. 6, and/or example 700 700 of FIG. 7.

Figure 8:
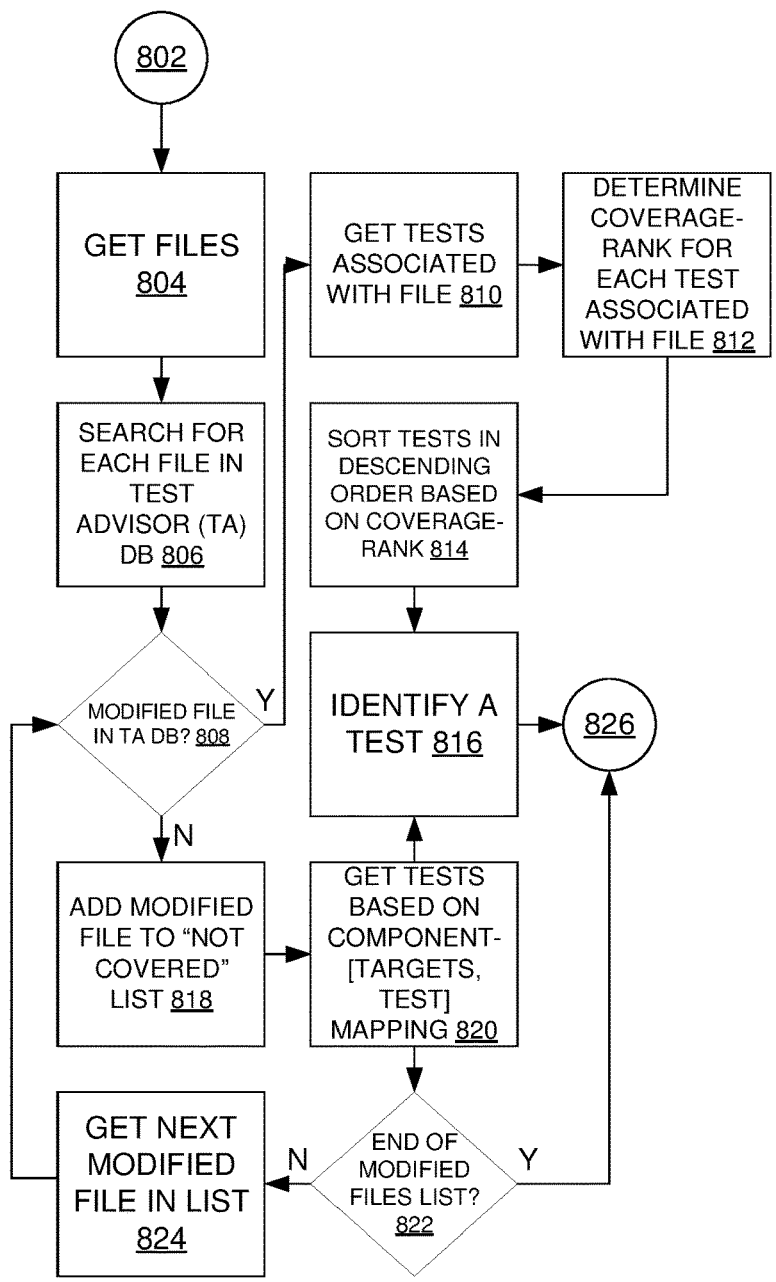
FIG. 8 illustrates an example process flow that can facilitate ranking tests based on code change and coverage, in accordance with an embodiment of this disclosure.
Figure 9:
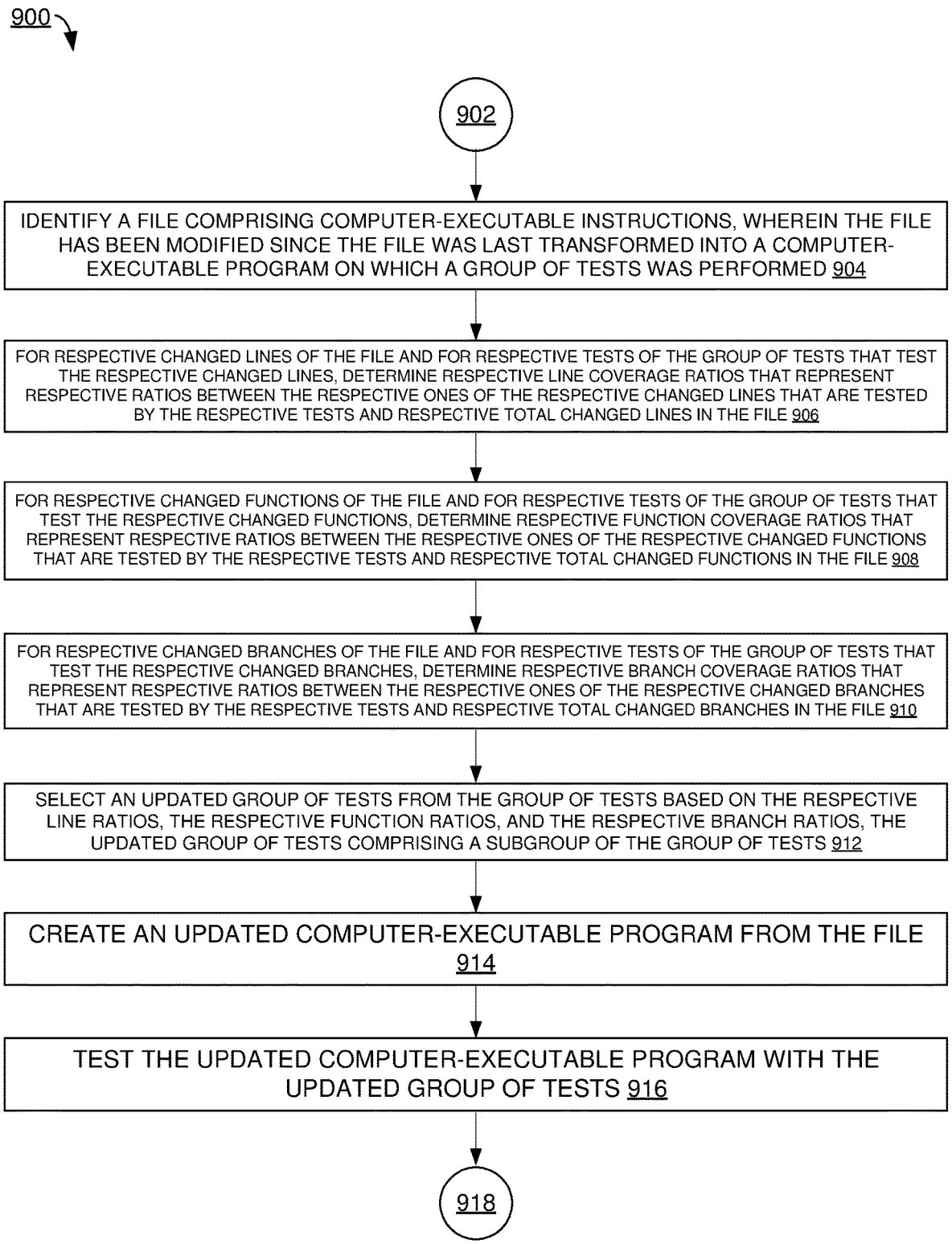
FIG. 9 illustrates another example process flow that can facilitate ranking tests based on code change and coverage, in accordance with an embodiment of this disclosure.
Figure 10:
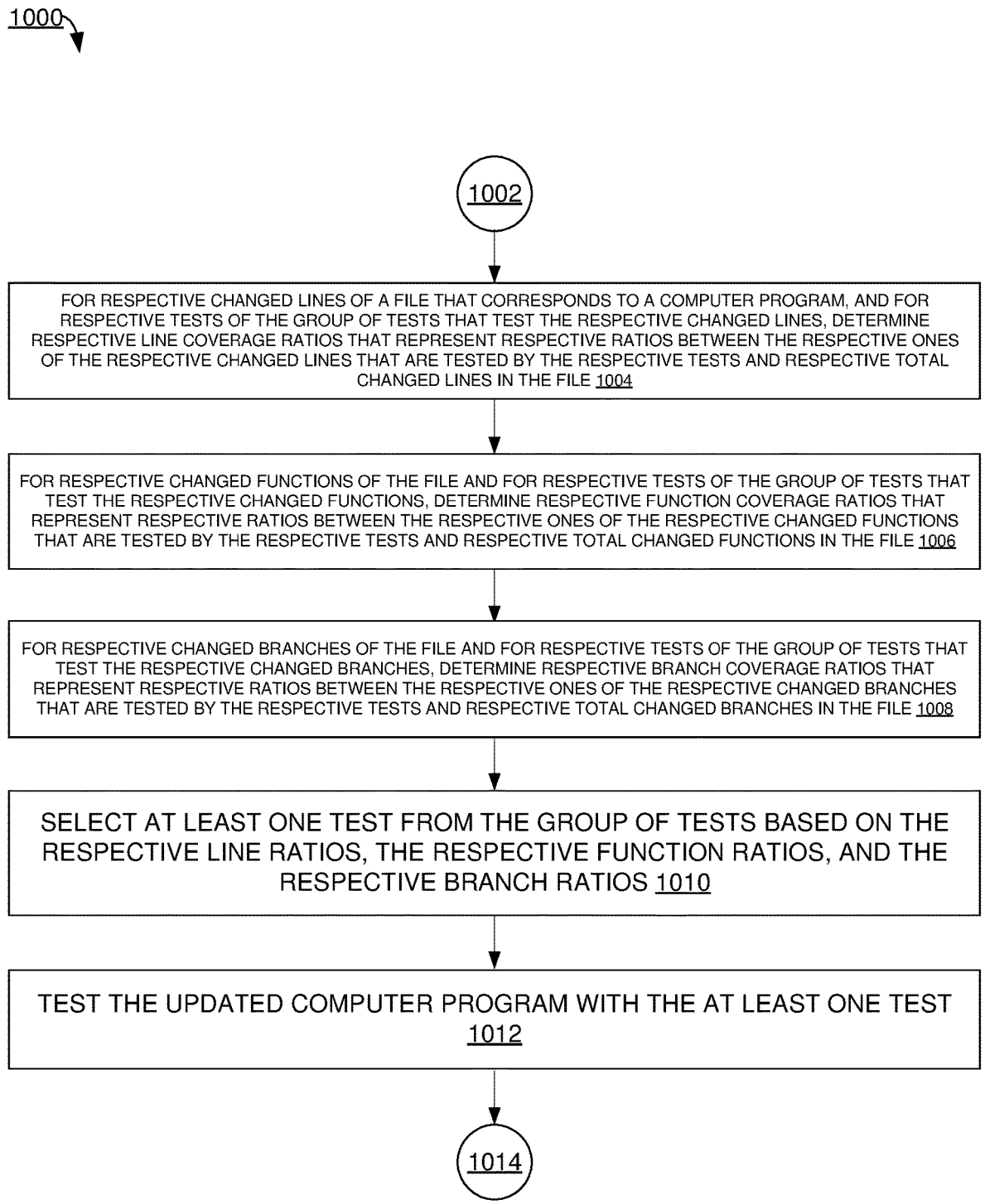
FIG. 10 illustrates another example process flow that can facilitate ranking tests based on code change and coverage, in accordance with an embodiment of this disclosure.
Figure 11:
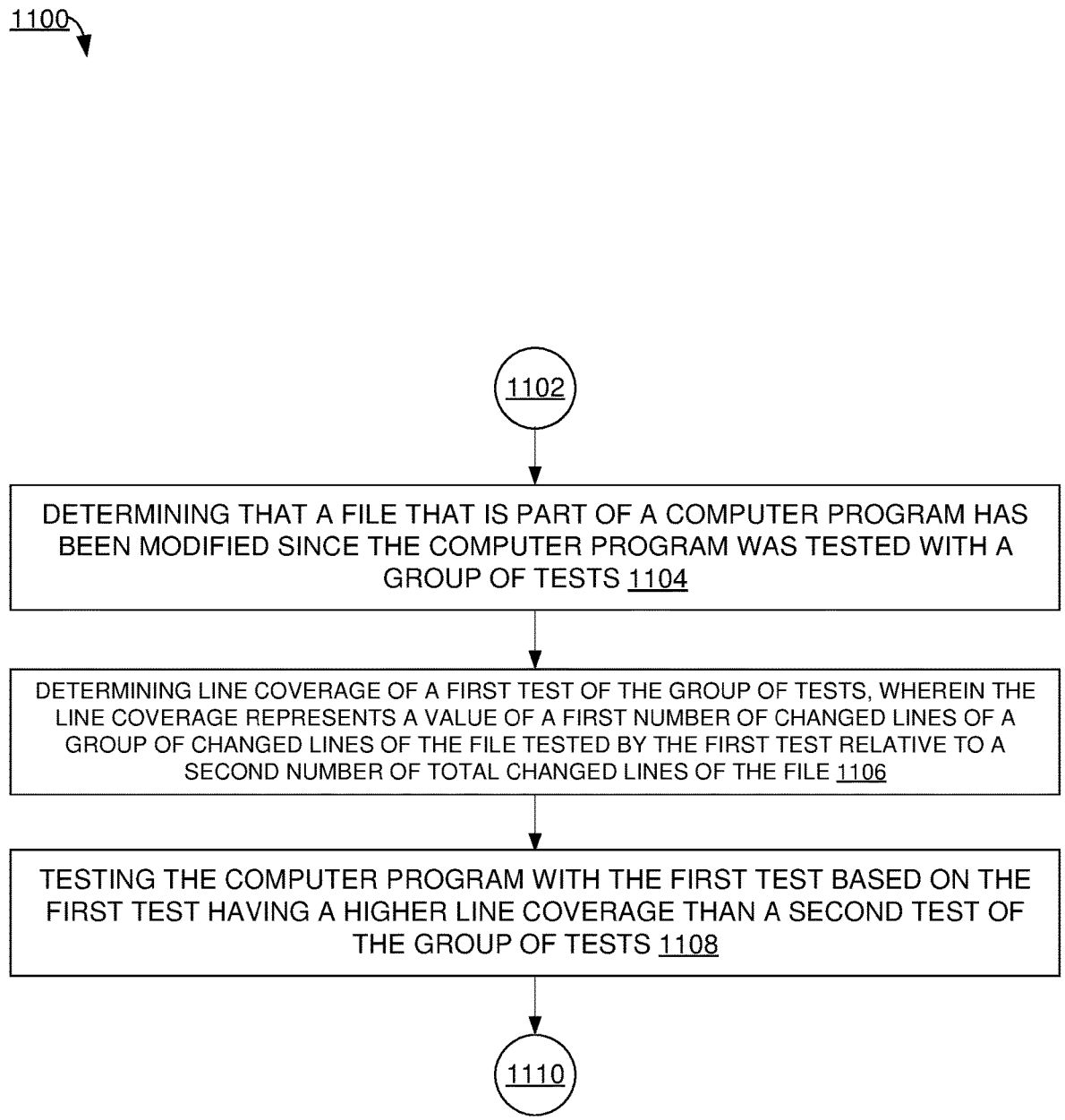
FIG. 11 illustrates another example process flow that can facilitate ranking tests based on code change and coverage, in accordance with an embodiment of this disclosure.

Additionally, in the course of implementing ranking tests based on code change and coverage, ranking tests based on code change and coverage component 106 can implement part(s) of process flow 800 of FIG. 8, process flow 900 of FIG. 9, process flow 1000 of FIG. 10, and/or process flow 1100 of FIG. 11.

FIG. 2 illustrates another example system architecture 200 that can facilitate ranking tests based on code change and coverage, in accordance with an embodiment of this disclosure. In some examples, part(s) of system architecture 200 can be used to implement part(s) of ranking tests based on code change and coverage component 106. As depicted, system architecture 200 comprises code coverage analysis 202, code coverage result analyzer 212, test advisor 216, test advisor representational state transfer (REST) server 222, log server 224, process code coverage results 226, and code coverage connect 228.

In turn, code coverage analysis 202 comprises configure 204, instrument and install 206, run tests 208, and analyze and report 210. Code coverage result analyzer 212 comprises process code coverage results for test advisor 214. Test advisor 216 comprises test advisor database 218 and recommendation engine 220. Code coverage connect 228 comprises code coverage database 230 and coverage web server 232.

Example Report

FIG. 3 illustrates an example report 300 of code coverage that can facilitate ranking tests based on code change and coverage, in accordance with an embodiment of this disclosure. In some examples, information in report 300 can be utilized by ranking tests based on code change and coverage component 106 to perform ranking tests based on code change and coverage. In report 300, an indication is given of code coverage at each of a line level, a branch level, and a function level. That is, for each line (or function or branch) of a computer program, an indication is given of how that line (or function or branch) is covered by tests of a testing suite.

Report 300 comprises legend 302, files 304, and statistics 306. Legend 302 gives an indication of much the files of files 304 (which contain code) are covered by tests. For each type of coverage (line, branch, or function), a visual indication is given of whether there is low coverage (<=75% of those units are covered), medium coverage (>75% but <90% of those units are covered), or high coverage (>90% of those units are covered).

Statistics 306 gives statistics for the code coverage across the files of files 304. For example, of 100 total lines of code, 80 are covered by tests, indicating that 80% of lines in files 304 are covered by tests.

Example Tree Structures and Rankings

FIG. 4 illustrates an example tree structure 400 of code coverage results that can facilitate ranking tests based on code change and coverage, in accordance with an embodiment of this disclosure. In some examples, information in tree structure 400 can be utilized by ranking tests based on code change and coverage component 106 of FIG. 1 to perform ranking tests based on code change and coverage.

Figure 5:
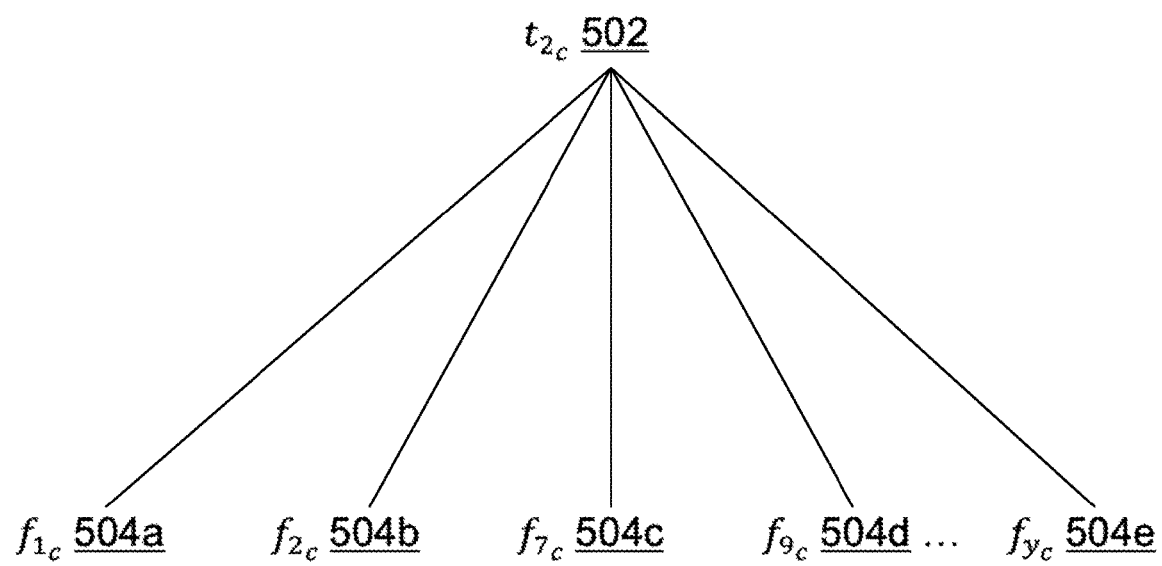
FIG. 5 illustrates another example tree structure of code coverage results that can facilitate ranking tests based on code change and coverage, in accordance with an embodiment of this disclosure.

Take an example where files $F=[f_1, f_2, f_3, \ldots, f_n]$ and tests $T=[t_1, t_2, t_3, \ldots, t_m]$, such that the tests $t_1, t_2, \ldots, t_m$ produced the coverage results for the associated files as shown in FIGS. 4-6. In tree structure 400, test $t_{1_c}$ 402 tests at least part of files $f_{1_c}$ 404a, $f_{2_c}$ 404b, $f_{3_c}$ 404c, and $f_{x_c}$ 404d.

FIG. 5 illustrates another example tree structure 500 of code coverage results that can facilitate ranking tests based on code change and coverage, in accordance with an embodiment of this disclosure. In some examples, information in tree structure 500 can be utilized by ranking tests based on code change and coverage component 106 of FIG. 1 to perform ranking tests based on code change and coverage. In tree structure 500, test $t_{2_c}$ 502 tests at least part of files $f_{1_c}$ 504a, $f_{2_c}$ 504b, $f_{7_c}$ 504c, $f_{9_c}$ 504d, and $f_{y_c}$ 504e.

FIG. 6 illustrates another example tree structure 600 of code coverage results that can facilitate ranking tests based on code change and coverage, in accordance with an embodiment of this disclosure. In some examples, information in tree structure 600 can be utilized by ranking tests based on code change and coverage component 106 of FIG. 1 to perform ranking tests based on code change and coverage. In tree structure 600, test $t_{m_c}$ 602 tests at least part of files $f_{1_c}$ 604a, $f_{2_c}$ 604b, $f_{7_c}$ 604c, $f_{y_c}$ 604d, and $f_{z_c}$ 604e.

FIG. 7 illustrates an example 700 of determining a test ranking that can facilitate ranking tests based on code change and coverage, in accordance with an embodiment of this disclosure. In some examples, information in example 700 can be utilized by ranking tests based on code change and coverage component 106 of FIG. 1 to perform ranking tests based on code change and coverage. In some examples, example 700 can utilize information in tree structure 400 of FIG. 4, tree structure 500 of FIG. 5, and/or tree structure 600 of FIG. 6.

Example 700 can continue from the example of FIGS. 4-6. That is, take an example where files $F=[f_1, f_2, f_3, \ldots, f_n]$ and tests $T=[t_1, t_2, t_3, \ldots, t_m]$, such that the tests $t_1, t_2, \ldots, t_m$ produced the coverage results for the associated files as shown in FIGS. 4-6. Based on the information represented in FIGS. 4-6, the following can be determined:

$f_{1_c} = t_{x_{f_{1_c}}}$ and where:

T is a set of all tests,

F is a set of files being tested, $t_{1_c}$ is the total code coverage for all files executed by $t_1$, $f_{1_c}$ is the total code coverage for file $f_1$, $$t_{1_{f_{1_c}}}$$

is the total code coverage for file $f_1$ based on test $t_1$, $$t_{1_{f_{1_c}l}}$$

is the line code coverage score for file $f_1$ based on test $t_1$, $$t_{1_{f_{1_c}f}}$$

is the function coverage score for file $f_1$ based on test $t_1$, $$t_{1_{f_{1_c}b}}$$

is the branch coverage score for file $f_1$ based on test $t_1$, and $$CR_{t_{1_{f_1}}}$$

is the CoverageRank of $t_1$ based on the test executing $f_1$.

Thus, for a given file $f_x$ in a changeset or pull request, $\forall t_x \in T'$ (note that $T' \in T$) can be prioritized in a descending order based on $$CR_{t_{x_{f_y}}}$$

to determine a suitable test for execution.

Example Process Flows

FIG. 8 illustrates an example process flow 800 that can facilitate ranking tests based on code change and coverage, in accordance with an embodiment of this disclosure. In some examples, one or more embodiments of process flow 800 can be implemented by ranking tests based on code change and coverage component 106 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, process flow 1000 of FIG. 10, and/or process flow 1100 of FIG. 11.

Process flow 800 begins with 802, and moves to operation 804. Operation 804 depicts getting files. These can be files that make up the code base of a program. After operation 804, process flow 800 moves to operation 806.

Operation 806 depicts searching for each file in a test advisor database. A test advisor database can maintain an association between files of a program and tests that cover the file (or a line, branch, or function within the file). In some examples, a test advisor database is updated after running a test, so iteratively running tests can build off a previous iteration rather than starting from scratch in making these determinations. After operation 806, process flow 800 moves to operation 808.

Operation 808 depicts determining whether the modified file is in the test advisor database. Where it is determined in operation 808 that the modified file is in the test advisor database, process flow 800 moves to operation 810. Instead, where it is determined in operation 808 that the modified file is not in the test advisor database, process flow 800 moves to operation 818.

Operation 810 is reached from operation 808 where it is determined that the modified file is in the test advisor database. Operation 810 depicts getting each test associated with the file. After operation 810, process flow 800 moves to operation 812.

Operation 812 depicts determining a CoverageRank for each test associated with the file. In some examples, a CoverageRank can be determined in a similar manner as depicted in example 700 of FIG. 7. After operation 812, process flow 800 moves to operation 814.

Operation 814 depicts sorting the tests in descending order based on their CoverageRank. After operation 814, process flow 800 moves to operation 816.

Operation 816 depicts identifying a test. This can comprise identifying a test for testing the updated program, and can be performed based on CoverageRank values of the candidate tests. After operation 824, process flow 800 moves to 826, where process flow 800 ends.

Operation 818 is reached from operation 808 where it is determined that a modified file is not in a test advisor database. Operation 818 depicts adding the modified file to a "not covered" list. This can comprise a list of files that were not previously tested, so all lines and functions can be considered to be changed in the file. After operation 818, process flow 800 moves to operation 820.

Operation 820 depicts getting tests based on a component H [targets, tests] mapping. After operation 820, process flow 800 move to operation 816 and to operation 822.

Operation 822 depicts determining whether an end of a modified files list has been reached. Where it is determined in operation 822 that an end of a modified files list has been reached, process flow 800 moves to 826, where process flow 800 ends. Instead, where it is determined in operation 822 that an end of a modified files list has not been reached, process flow 800 moves to 824.

Operation 824 is reached from operation 822 where it determined that an end of a modified files list has not been reached. Operation 824 depicts getting the next modified file in the list. After operation 824, process flow 800 moves to operation 808.

FIG. 9 illustrates another example process flow 900 that can facilitate ranking tests based on code change and coverage, in accordance with an embodiment of this disclosure. In some examples, one or more embodiments of process flow 900 can be implemented by ranking tests based on code change and coverage component 106 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, process flow 1000 of FIG. 10, and/or process flow 1100 of FIG. 11.

Process flow 900 begins with 902, and moves to operation 904. Operation 904 depicts identifying a file comprising computer-executable instructions, wherein the file has been modified since the file was last transformed into a computer-executable program on which a group of tests was performed. That is, a program can be tested periodically as it is updated. The changed files can be those files that have been changed since a previous test (e.g., a most-recent test) was performed on the program. A change can be, e.g., a change to a line of computer code stored in one of the files.

In some examples, operation 904 comprises, as a result of previously testing the computer-executable program, storing an indication of which tests were performed as part of previously testing the computer-executable program, a group of at least one file that comprises the file that was tested, and which test of the group of tests tested a particular line, function, or branch of the group of at least one file. That is, a test advisor database can be maintained, and it can be updated at the end of a code coverage test pass, so that when a new code coverage test pass is performed, information about code coverage by tests from the previous pass can be utilized in performing the current pass.

In some examples, the identifying of the file is based on the file being identified in a changeset. In some examples, the identifying of the file is based on the file being identified in a pull request. That is, in some examples, files can be identified as being changed where they are part of a changeset or a pull request. A changeset can comprise one or more files stored in a version control system that are treated as a collective group of changes (e.g., the changes from v1.0 to v1.1 of a program). A pull request can comprise a set of changes to one or more files that is submitted for merging to a main branch of computer code for a program.

After operation 904, process flow 900 moves to operation 906.

Operation 906 depicts, for respective changed lines of the file and for respective tests of the group of tests that test the respective changed lines, determining respective line coverage ratios that represent respective ratios between the respective ones of the respective changed lines that are tested by the respective tests and respective total changed lines in the file. A line coverage ratio for a test can represent a number of changed lines the test tests for a file relative to the number of all changed lines in the file.

After operation 906, process flow 900 moves to operation 908.

Operation 908 depicts, for respective changed functions of the file and for respective tests of the group of tests that test the respective changed functions, determining respective function coverage ratios that represent respective ratios between the respective ones of the respective changed functions that are tested by the respective tests and respective total changed functions in the file. A function coverage ratio for a test can represent a number of changed functions in computer code that the test tests for a file relative to the number of all changed functions in the file.

After operation 908, process flow 900 moves to operation 910.

Operation 910 depicts, for respective changed branches of the file and for respective tests of the group of tests that test the respective changed branches, determining respective branch coverage ratios that represent respective ratios between the respective ones of the respective changed branches that are tested by the respective tests and respective total changed branches in the file. A line coverage ratio for a test can represent a number of changed branches in computer code (e.g., an IF (X) THEN do Y, ELSE do Z) that the test tests for a file relative to the number of all changed branches in the file.

After operation 910, process flow 900 moves to operation 912.

Operation 912 depicts selecting an updated group of tests from the group of tests based on the respective line ratios, the respective function ratios, and the respective branch ratios, the updated group of tests comprising a subgroup of the group of tests. In some examples, these coverage ratios can be utilized to select fewer than all of the tests, to focus testing on the changes made to the computer code of the program.

In some examples, operation 912 comprises selecting a first test for the updated group of tests based on the first test having a highest line coverage ratio of the group of tests. That is, a test can be selected based on that test having a line coverage ratio. In some examples, operation 912 comprises selecting a first test for the updated group of tests based on the first test having a highest function coverage ratio of the group of tests. That is, a test can be selected based on that test having a function coverage ratio. In some examples, operation 912 comprises selecting a first test for the updated group of tests based on the first test having a highest branch coverage ratio of the group of tests. That is, a test can be selected based on that test having a branch coverage ratio.

After operation 912, process flow 900 moves to operation 914.

Operation 914 depicts creating an updated computer-executable program from the file.

After operation 914, process flow 900 moves to operation 916.

Operation 916 depicts testing the updated computer-executable program with the updated group of tests.

After operation 916, process flow 900 moves to 918, where process flow 900 ends.

FIG. 10 illustrates another example process flow 1000 that can facilitate ranking tests based on code change and coverage, in accordance with an embodiment of this disclosure. In some examples, one or more embodiments of process flow 1000 can be implemented by ranking tests based on code change and coverage component 106 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, process flow 900 of FIG. 9, and/or process flow 1100 of FIG. 11.

Process flow 1000 begins with 1002, and moves to operation 1004. Operation 1004 depicts, for respective changed lines of a file that corresponds to a computer program, and for respective tests of the group of tests that test the respective changed lines, determining respective line coverage ratios that represent respective ratios between the respective ones of the respective changed lines that are tested by the respective tests and respective total changed lines in the file. In some examples, operation 1004 can be implemented in a similar manner as operation 906 of FIG. 9.

In some examples, the respective changed lines are changed relative to a previous version of the file that corresponds to a previous version of the computer program that was tested with the group of tests. That is, lines can be considered to be changed relative to the corresponding lines in a previous version of a file or program that has been tested.

After operation 1004, process flow 1000 moves to operation 1006.

Operation 1006 depicts, for respective changed functions of the file and for respective tests of the group of tests that test the respective changed functions, determining respective function coverage ratios that represent respective ratios between the respective ones of the respective changed functions that are tested by the respective tests and respective total changed functions in the file. In some examples, operation 1006 can be implemented in a similar manner as operation 908 of FIG. 9.

After operation 1006, process flow 1000 moves to operation 1008.

Operation 1008 depicts, for respective changed branches of the file and for respective tests of the group of tests that test the respective changed branches, determining respective branch coverage ratios that represent respective ratios between the respective ones of the respective changed branches that are tested by the respective tests and respective total changed branches in the file.

After operation 1008, process flow 1000 moves to operation 1010. In some examples, operation 1008 can be implemented in a similar manner as operation 910 of FIG. 9.

Operation 1010 depicts selecting at least one test from the group of tests based on the respective line ratios, the respective function ratios, and the respective branch ratios. In some examples, operation 1010 can be implemented in a similar manner as operation 912 of FIG. 9.

In some examples, the selecting of at least one test is based on respective historic execution time of the respective test. In some examples, the selecting of at least one test is based on respective historic fault detection rate of the respective tests. In some examples, the selecting of at least one test is based on respective failed or failing tests of the respective tests. That is, in some examples, other test selection criteria in addition to coverage ratios can be used for test selection. These criteria can include historic execution time, fault detection rate, and that a particular test is failed or failing.

In some examples, operation 1010 comprises examining the respective tests for the selecting in a descending order of values of respective line coverage ratios, respective function coverage ratios, or respective branch coverage ratios. That is, once coverage ratios have been determined, the tests can be analyzed for selection in descending order of coverage ratio values.

In some examples, operation 1010 comprises selecting a first test of the group of tests for the at least one test based on the first test having a line coverage ratio greater than a predetermined threshold value. That is, a threshold value for a coverage ratio can be set, and a test can be selected that exceeds this threshold value.

After operation 1010, process flow 1000 moves to operation 1012.

Operation 1012 depicts testing the updated computer program with the at least one test. In some examples, operation 1012 can be implemented in a similar manner as operation 916 of FIG. 9.

After operation 1012, process flow 1000 moves to 1014, where process flow 1000 ends.

FIG. 11 illustrates another example process flow 1100 that can facilitate ranking tests based on code change and coverage, in accordance with an embodiment of this disclosure. In some examples, one or more embodiments of process flow 1100 can be implemented by ranking tests based on code change and coverage component 106 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 800 of FIG. 8, process flow 900 of FIG. 9, and/or process flow 1000 of FIG. 10.

Process flow 1100 begins with 1102, and moves to operation 1104. Operation 1104 depicts determining that a file that is part of a computer program has been modified since the computer program was tested with a group of tests. In some examples, operation 1104 can be implemented in a similar manner as operation 904 of FIG. 9.

After operation 1104, process flow 1100 moves to operation 1106.

Operation 1106 depicts determining line coverage of a first test of the group of tests, wherein the line coverage represents a value of a first number of changed lines of a group of changed lines of the file tested by the first test relative to a second number of total changed lines of the file. In some examples, operation 1106 can be implemented in a similar manner as operation 906 of FIG. 9.

After operation 1106, process flow 1100 moves to operation 1108.

Operation 1108 depicts, testing the computer program with the first test based on the first test having a higher line coverage than a second test of the group of tests. In some examples, operation 1108 can be implemented in a similar manner as operation 916 of FIG. 9.

In some examples, the group of tests is a first group of tests, and operation 1108 comprises determining a predetermined threshold value, determining a predetermined number of tests, and selecting a second group of tests equal to the predetermined number of tests based on the respective tests of the group of tests having a respective line coverage above the predetermined threshold value. That is, N tests that meet a threshold coverage value can be selected for testing.

In some examples, the second group of tests represents first tests of the group of tests encountered while examining the group of tests that having the respective line coverage above the predetermined threshold value. That is, when examining tests, the first N tests that are determined to meet the criteria can be selected for the testing.

In some examples, the testing of the computer program is performed with a subset of the group of tests, the subset comprising the first test. That is, in some examples, the testing can be done with some, but not all tests.

In some examples, in response to determining that a first file that corresponds to the computer program was not covered by the computer program being tested with the group of tests, mapping a component of the first file to a pair comprising a target of the first file and a third test of the group of tests that tests the component. That is, a component↔[targets, tests] mapping can be utilized where the file has not previously been tested.

In some examples, determining that the first file that corresponds to the computer program was not covered by the computer program being tested with the group of tests based on an indication of the first file being omitted from a stored indication of which files were tested as part of previously testing the computer program. That is, the file can be determined not to have previously been tested where the file is not listed in a test advisor database.

After operation 1108, process flow 1000 moves to 1110, where process flow 1000 ends.

Example Operating Environment

Figure 12:
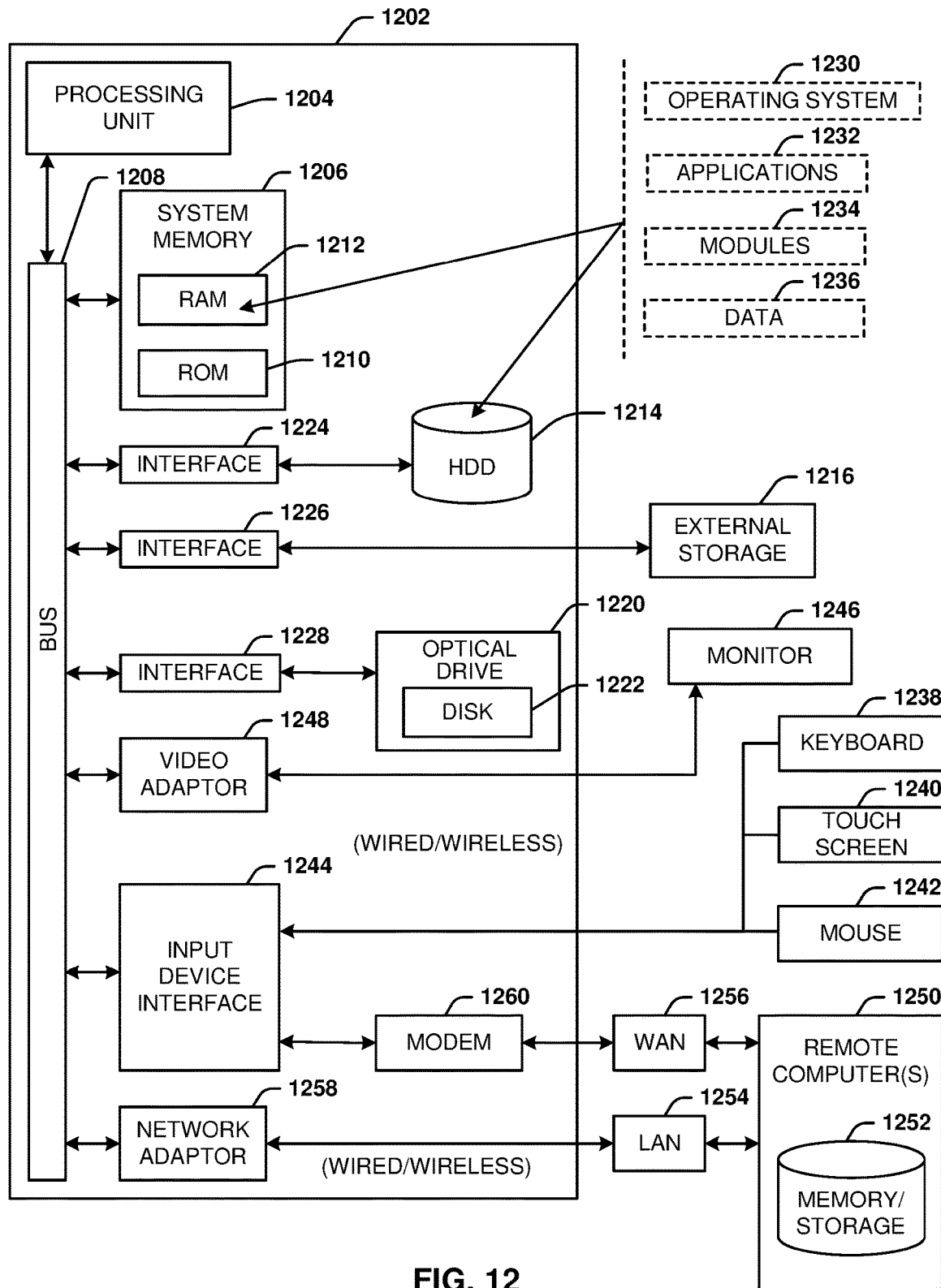
FIG. 12 illustrates an example block diagram of a computer operable to execute an embodiment of this disclosure.

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of computer system 102 of FIG. 1.

In some examples, computing environment 1200 can implement one or more embodiments of the process flows of FIGS. 8-11 to facilitate ranking tests based on code change and coverage.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   identifying a file comprising computer-executable instructions, wherein the file has been modified since the file was last transformed into a computer-executable program on which a group of tests was performed;
   for respective changed lines of the file and for respective first tests of the group of tests that test the respective changed lines, determining respective line coverage ratios that represent respective ratios between the respective ones of the respective changed lines that are tested by the respective first tests and respective total changed lines in the file;
   for respective changed functions of the file and for respective second tests of the group of tests that test the respective changed functions, determining respective function coverage ratios that represent respective ratios between the respective ones of the respective changed functions that are tested by the respective second tests and respective total changed functions in the file;
   for respective changed branches of the file and for respective third tests of the group of tests that test the respective changed branches, determining respective branch coverage ratios that represent respective ratios between the respective ones of the respective changed branches that are tested by the respective third tests and respective total changed branches in the file;
   selecting an updated group of tests from the group of tests based on the respective line coverage ratios, the respective function coverage ratios, and the respective branch coverage ratios, based on a first test of the respective first tests having a line coverage ratio greater than a threshold value,
   wherein the threshold value is greater than zero, wherein the updated group of tests comprises a subgroup of the group of tests, and based on respective failed or failing tests of respective tests of the group of tests,
   wherein a failure of a prior version of the computer-executable program was identified when tested with the respective failed or failing tests,
   wherein the first test is selected based on the first test having a highest line coverage ratio among the group of tests, wherein a second test is selected for the updated group of tests based on the second test having a highest function coverage ratio among the group of tests,
   wherein a third test is selected for the updated group of tests based on the third test having a highest branch coverage ratio among the group of tests, and
   wherein the first test, the second test, and the third test are selected independently of a combined coverage ratio of the first test, the second test, and the third test;
   creating an updated computer-executable program from the file; and
   testing the updated computer-executable program with the updated group of tests.

2. The system of claim 1, wherein the operations further comprise:
   as a result of previously testing the computer-executable program, wherein previously testing the computer-executable program comprises testing the file, storing an indication of which tests were performed as part of previously testing the computer-executable program, a group of at least one file that comprises the file that was tested, and which test of the group of tests tested a particular line, function, or branch of the group of at least one file.

3. The system of claim 1, wherein the identifying of the file is based on the file being identified in a changeset.

4. The system of claim 1, wherein the identifying of the file is based on the file being identified in a pull request.

5. The system of claim 1, wherein the selecting of the updated group of tests is based on respective historic execution time of the respective tests of the group of tests.

6. The system of claim 1, wherein the selecting of the updated group of tests is based on respective historic fault detection rate of the respective tests of the group of tests.

7. The system of claim 1, further comprising:
   examining respective tests of the group of tests for the selecting in a descending order of values of the respective line coverage ratios, the respective function coverage ratios, or the respective branch coverage ratios.

8. A method, comprising:
   for respective changed lines of a file that corresponds to a computer program, and for respective first tests of a group of tests that test the respective changed lines, determining, by a system comprising a processor, respective line coverage ratios that represent respective ratios between the respective ones of the respective changed lines that are tested by the respective first tests and respective total changed lines in the file;
   for respective changed functions of the file and for respective second tests of the group of tests that test the respective changed functions, determining, by the system, respective function coverage ratios that represent respective ratios between the respective ones of the respective changed functions that are tested by the respective second tests and respective total changed functions in the file;
   for respective changed branches of the file and for respective third tests of the group of tests that test the respective changed branches, determining, by the system, respective branch coverage ratios that represent respective ratios between the respective ones of the respective changed branches that are tested by the respective third tests and respective total changed branches in the file;
   selecting, by the system, a subset of tests from the group of tests based on the respective line coverage ratios, the respective function coverage ratios, and the respective branch coverage ratios, based on a first test of the respective first tests having a line coverage ratio greater than a defined threshold value,
   wherein the defined threshold value is greater than zero, and based on respective failed or failing tests of respective tests of the group of tests,
   wherein a failure of a prior version of the computer program was identified when tested with the respective failed or failing tests, wherein the first test of the subset of tests is selected based on the first test having a highest line coverage ratio among the group of tests, wherein a second test of the subset of tests is selected based the second test having a highest function coverage ratio among the group of tests, and wherein a third test of the subset of tests is selected for the subset of tests based on the third test having a highest branch coverage ratio among the group of tests; and testing, by the system, the computer program with the subset of tests.

9. The method of claim 8, wherein the selecting of the subset of tests is based on respective historic execution time of respective tests of the group of tests.

10. The method of claim 8, wherein the selecting of the subset of tests is based on respective historic fault detection rate of respective tests of the group of tests.

11. The method of claim 8, further comprising:
examining, by the system, respective tests of the group of tests for the selecting in a descending order of values of the respective line coverage ratios, the respective function coverage ratios, or the respective branch coverage ratios.

12. The method of claim 8, wherein the respective changed lines are changed relative to a previous version of the file that corresponds to a previous version of the computer program that was tested with the group of tests.

13. The method of claim 8, further comprising:
as a result of previously testing the computer program, wherein previously testing the computer program comprises testing the file, storing, by the system, an indication of which tests were performed as part of previously testing the computer program, a group of at least one file that comprises the file that was tested, and which test of the group of tests tested a particular line, function, or branch of the group of at least one file.

14. A non-transitory computer-readable medium comprising instructions that, in response to execution, cause a system comprising a processor to perform operations, comprising:
determining that a file that is part of a computer program has been modified since the computer program was tested with a group of tests;
determining line coverage of a first test of the group of tests, wherein the line coverage represents a value of a first number of changed lines of a group of changed lines of the file tested by the first test relative to a second number of total changed lines of the file; and
testing the computer program with the first test based on the first test having a highest line coverage ratio among the group of tests, with a second test of the group of tests based on the second test having a highest function coverage ratio among the group of tests, and with a third test of the group of tests based on the third test having a highest branch coverage ratio among the group of tests, based on the first test having a line coverage ratio greater than a predetermined threshold value, wherein the predetermined threshold value is greater than zero, and based on a failure of a prior version of the computer program being identified when tested with the first test.

15. The non-transitory computer-readable medium of claim 14, wherein the group of tests is a first group of tests, and wherein the operations further comprise:
determining a predetermined number of tests, wherein the predetermined number of tests is greater than one; and
selecting a second group of tests equal to the predetermined number of tests based on respective tests of the group of tests having a respective line coverage above the predetermined threshold value.

16. The non-transitory computer-readable medium of claim 15, wherein the second group of tests represents first tests of the group of tests encountered while examining the group of tests that having the respective line coverage above the predetermined threshold value.

17. The non-transitory computer-readable medium of claim 14, wherein the testing of the computer program is performed with a subset of the group of tests, the subset comprising the first test.

18. The non-transitory computer-readable medium of claim 14, wherein the operations further comprise:
in response to determining that a first file that corresponds to the computer program is not covered with the group of tests, mapping a component of the first file to a pair comprising a target of the first file and a fourth test of the group of tests that tests the component.

19. The non-transitory computer-readable medium of claim 18, wherein the operations further comprise:
determining that the first file that corresponds to the computer program was not covered by the computer program being tested with the group of tests based on an indication of the first file being omitted from a stored indication of which files were tested as part of previously testing the computer program.

20. The non-transitory computer-readable medium of claim 14, wherein the operations further comprise:
as a result of previously testing the computer program, wherein previously testing the computer program comprises testing the file, storing, by the system, an indication of which tests were performed as part of previously testing the computer program, a group of at least one file that comprises the file that was tested, and which test of the group of tests tested a particular line, function, or branch of the group of at least one file.

* * * * *